(12) United States Patent
Laitala et al.

(10) Patent No.: US 8,552,340 B2
(45) Date of Patent: Oct. 8, 2013

(54) ENCLOSED WELDER WITH RECESS PANEL

(75) Inventors: John Patrick Laitala, Appleton, WI (US); Joel Raymond Ort, Hortonville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 495 days.

(21) Appl. No.: 12/627,951

(22) Filed: Nov. 30, 2009

(65) Prior Publication Data

US 2010/0147817 A1 Jun. 17, 2010

Related U.S. Application Data

(60) Provisional application No. 61/122,999, filed on Dec. 16, 2008.

(51) Int. Cl.
*B23K 9/10* (2006.01)

(52) U.S. Cl.
USPC .......................................... 219/133; 219/136

(58) Field of Classification Search
USPC .................................................. 219/133, 136
See application file for complete search history.

(56) References Cited

U.S. PATENT DOCUMENTS

| | | | | |
|---|---|---|---|---|
| 4,868,365 | A | * | 9/1989 | Farone et al. ............ 219/121.64 |
| 5,624,589 | A | * | 4/1997 | Latvis et al. .................. 219/133 |
| 7,549,403 | B2 | | 6/2009 | Yamamoto et al. |
| 2006/0157988 | A1 | | 7/2006 | Mazuka et al. |

* cited by examiner

*Primary Examiner* — Huan Hoang
(74) *Attorney, Agent, or Firm* — Fletcher Yoder P.C.

(57) ABSTRACT

Embodiments of an enclosed welder that includes a recess disposed at a depth in a rear panel of the enclosure are provided. The recess may include at least one of an engine air filter, a blower housing, and a recoil start. The depth at which the recess is set back from the rear panel may be such that the engine air filter, the blower housing, and the recoil start each do not extend outward beyond the rear panel. A first air source may be configured to enter the enclosed welder via the air filter and combust fuel within an engine. A second air source may further be configured to enter the welder via the blower housing and cool the engine.

20 Claims, 4 Drawing Sheets

ENCLOSED WELDER WITH RECESS PANEL

CROSS REFERENCE TO RELATED APPLICATIONS

This application is a Non-provisional patent application of U.S. Provisional Patent Application No. 61/122,999, entitled "Recessed Engine Air Management System", filed Dec. 16, 2008, which is herein incorporated by reference.

BACKGROUND

The invention relates generally to welding devices, and more particularly, to a welder with a small combustion engine.

Welding is a process that has increasingly become ubiquitous in various industries and applications. While such processes may be automated in certain contexts, a large number of applications continue to exist for manual welding operations, which rely on the use of an engine-driven welder/generator to power the welding process. Specifically, welders with small internal combustion engines are often used in applications such as small scale maintenance and repair work, farm and ranch welding, and small scale construction, among others. Such welders typically include functional components such as electrical circuitry, a generator, the single cylinder engine, a muffler, and the like, which produce substantial amounts of heat during operation.

Welders with small internal combustion engines are typically provided in open frame models, in which the engine, among other components, remains unenclosed. These welders typically provide a low cost portable system for use in small scale welding applications. However, such welders leave the engine, as well as other components, exposed to the welding environment. Since welding environments typically include harsh conditions, such as weld splatter and extreme heat, weld components may be damaged during use. Accordingly, there exists a need for improved welders with engine-driven generators that overcome these drawbacks.

BRIEF DESCRIPTION

Embodiments of an enclosed welder that includes a recess extending into a rear panel of an enclosure are provided. The recess may include at least one of an engine air filter, a blower housing, and a recoil start. The depth at which the recess is set back from the rear panel may be such that the engine air filter, the blower housing, and the recoil start each do not extend outward beyond the rear panel. The enclosed welder may include a small engine suitable for use in small scale welding operations, among others. Certain embodiments of the welder may include one or more air sources that are configured to enter the welder at a cool temperature and exit the welder at a significantly higher temperature. A first air source may be configured to enter the welder via the air filter located in the recess and direct the air into the engine for use in the combustion process. A second air source may be configured to enter the welder via the blower housing located in the recess and cool the engine.

DRAWINGS

These and other features, aspects, and advantages of the present invention will become better understood when the following detailed description is read with reference to the accompanying drawings in which like characters represent like parts throughout the drawings, wherein.

Figure 1:
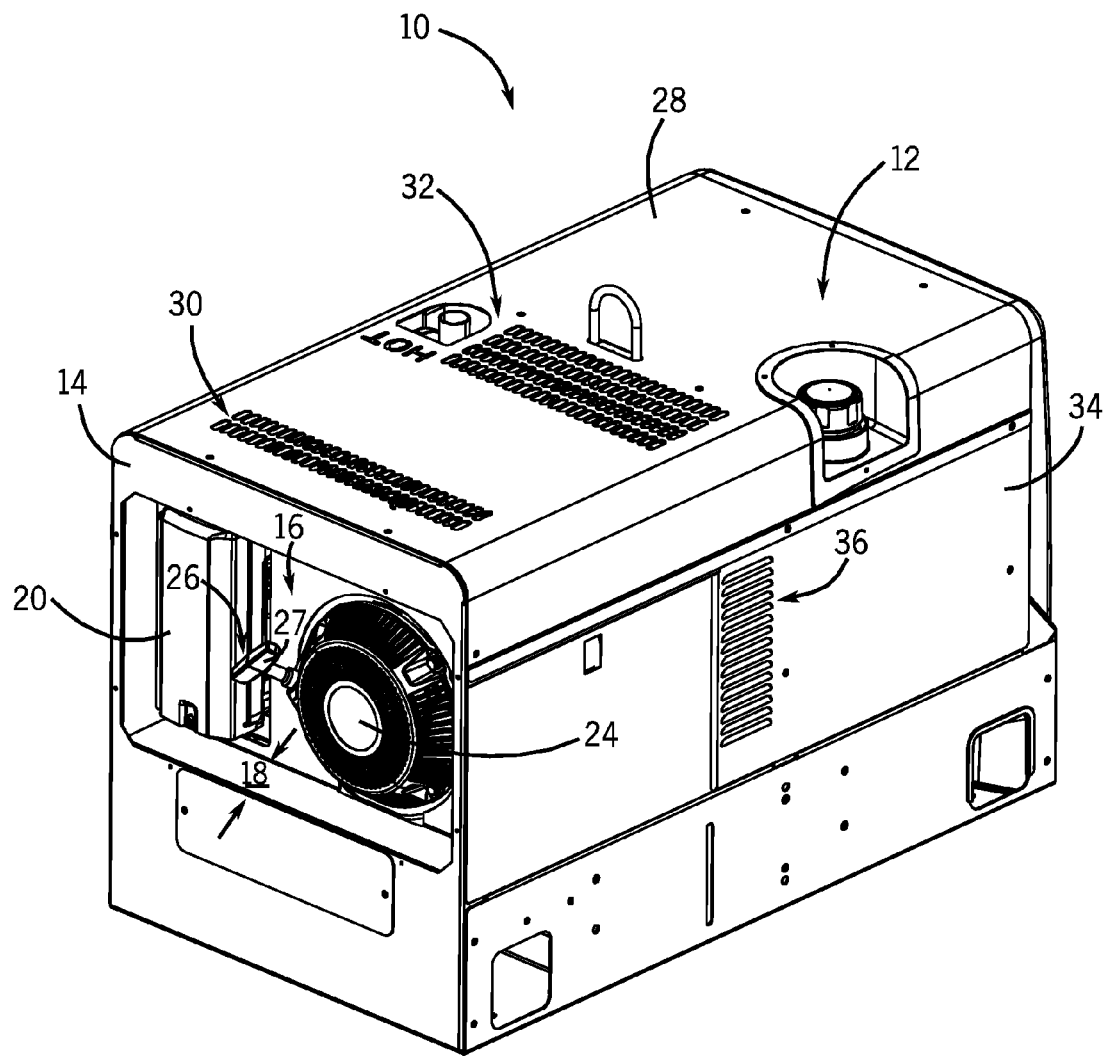
FIG. 1 is a perspective view of an exemplary enclosed welder with a recessed rear panel in accordance with embodiments of the present invention.
Figure 3:
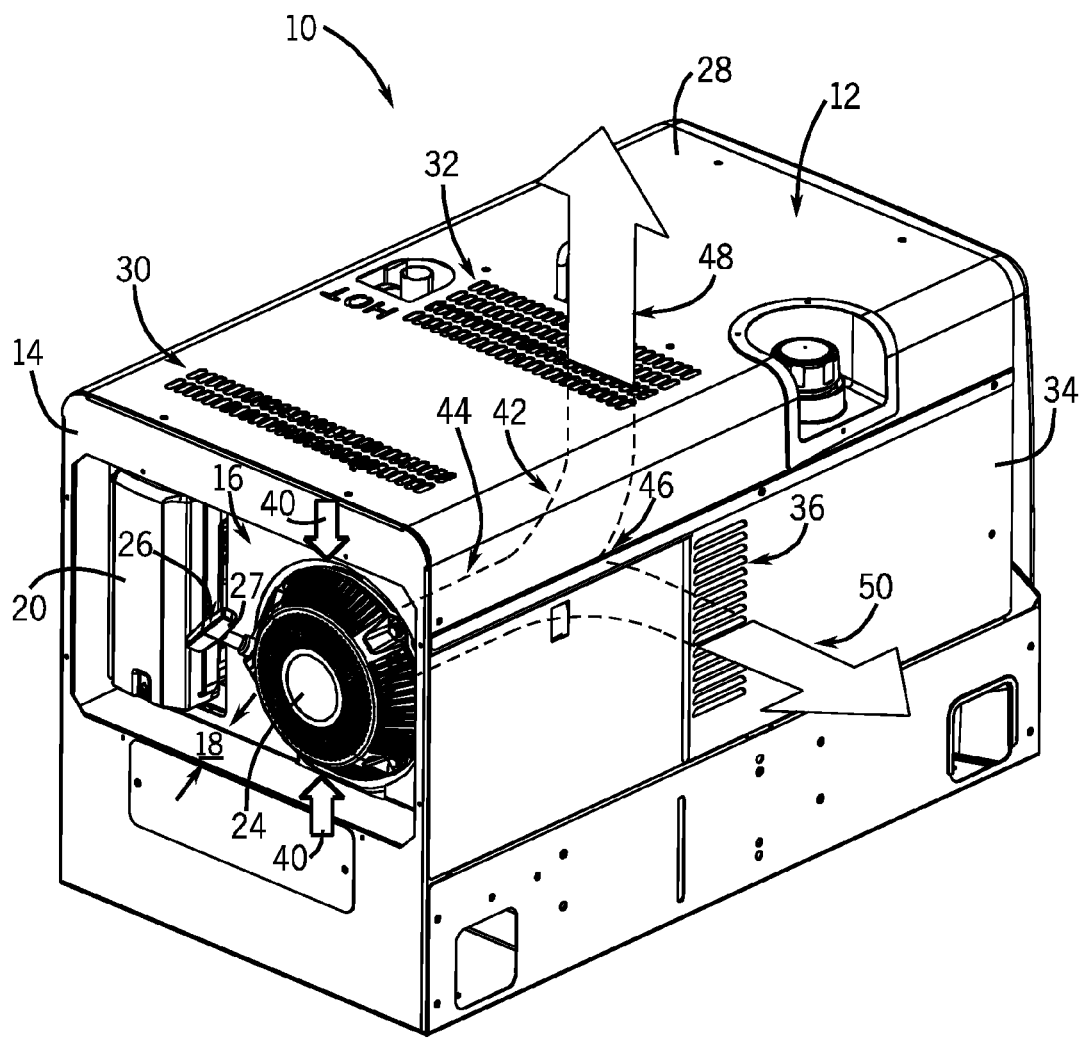
Figure 4:
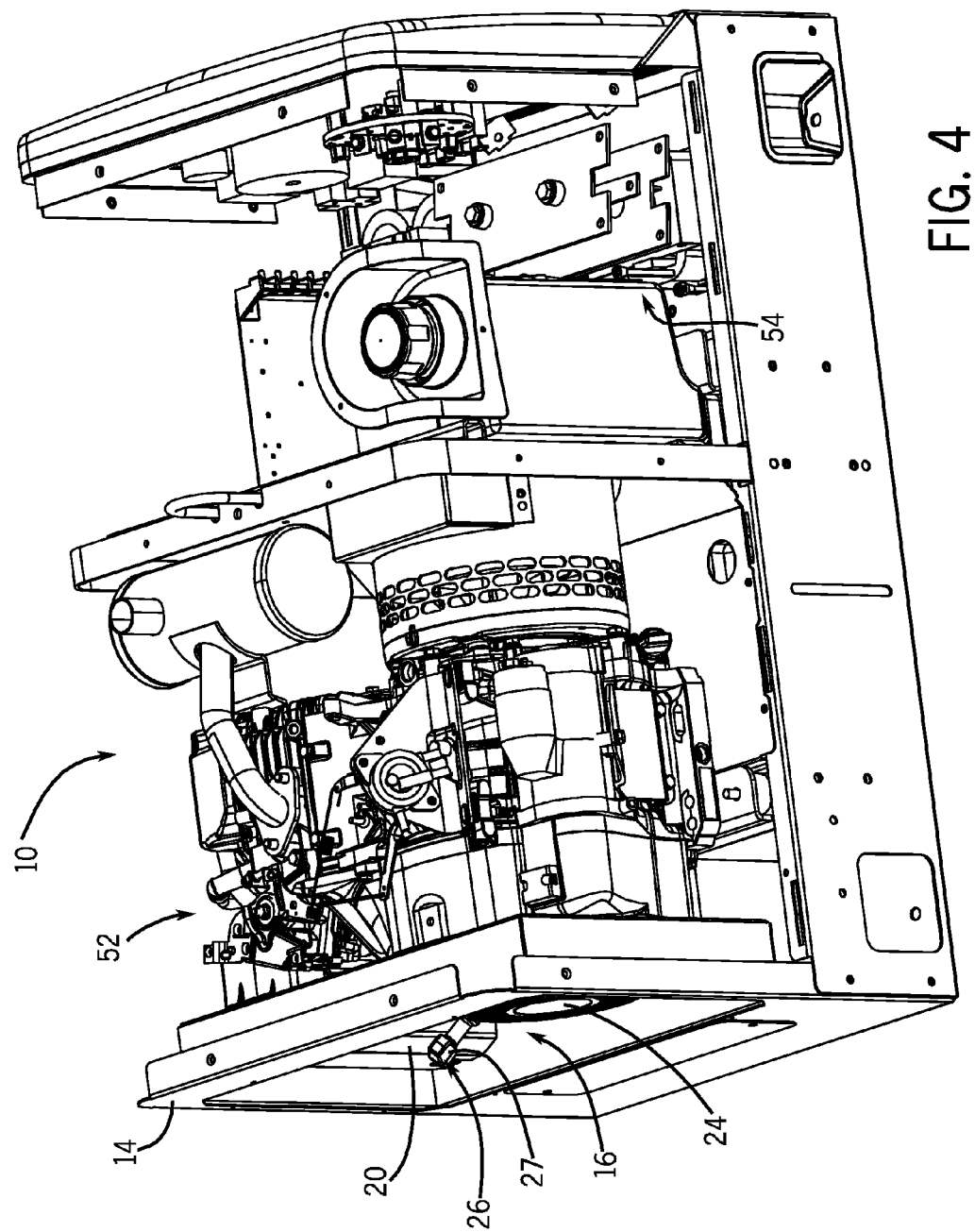

FIG. 3 is a perspective view of the welder of FIG. 1 illustrating an exemplary air flow path that cools a single cylinder engine within the welder in accordance with embodiments of the present invention; and FIG. 4 is a top perspective view of the welder of FIG. 1 with a top panel and a side panel removed illustrating internal components of the welder in accordance with embodiments of the present invention.

DETAILED DESCRIPTION

As discussed in detail below, embodiments are described of an enclosed welder that includes a recess extending into a rear panel of the enclosure. In certain embodiments, the recess may include at least one of an engine air filter, a blower housing, and a recoil start. The depth at which the recess is set back from the rear panel may be selected such that the engine air filter, the blower housing, and the recoil start each do not extend outward beyond the rear panel. The foregoing features may have the effect of facilitating a manual restart of a single cylinder engine located inside the enclosure without the disassembly of parts of the welder or even the removal of access panels. Furthermore, the aforementioned features may also facilitate the maintenance and replacement of the engine air filter, since the filter may be accessed without exposing the internals of the welder.

In presently contemplated embodiments, the welder may include a small (e.g., single cylinder) engine suitable for use in small scale welding operations. Certain embodiments of the welder may include one or more air sources that are configured to enter the welder at a cool temperature and exit the welder at a significantly higher temperature. Specifically, in some embodiments, a first air source may be configured to enter the welder via the air filter located in the recess and be utilized as combustion air within the engine. In further embodiments, a second air source may be configured to enter the welder via the blower housing located in the recess and cool the single cylinder engine within the enclosure. Still further, a third air source may be configured to enter a front of the welder and cool electrical components located within the enclosure.

Turning now to the drawings, FIG. 1 is a perspective view of an exemplary enclosed welder 10 that may be used to perform a variety of welding processes, such as shielded metal arc welding (SMAW) processes (e.g., stick welding) and gas tungsten arc welding (GTAW) processes (e.g., tungsten inert gas (TIG) welding). It should be noted that although embodiments of the present invention are discussed in the context of a welder, the disclosed systems and devices may be used in other suitable contexts, such as plasma cutting. In the illustrated embodiment, the welder 10 includes an enclosure 12 that encompasses a variety of internal components, such as a single cylinder engine, a muffler, fans, electrical components, and the like. That is, in embodiments of the present invention, the enclosure 12 fully envelopes functional components of the welder 10, thereby reducing or preventing physical damage to internal components due to exposure to harsh conditions that may be present in welding environments (e.g., extreme heat, weld splatter, jobsite debris, and so forth). For example, in the embodiment illustrated in FIG. 1, the engine is fully enveloped by the enclosure 12 such that particulates in the welding environment may be prevented from entering the engine, and the potential for damage to components of the engine may be reduced or prevented.

The enclosure 12 includes a rear panel 14 that covers a back of the welder 10. The rear panel 14 includes a recessed panel 16, which is set back from the rear panel 14 by a depth 18. The recessed panel 16 includes openings to expose the engine air filter 20. The recessed panel 16 also includes an engine blower housing 24 coupled to a recoil start 26 that includes a recoil knob 27. The enclosure 12 also includes a top panel 28 with a first set of vents 30 and a second set of vents 32 as well as a side panel 34 with a set of vents 36. The vents 30, 32, 36 may be used to vent heated air from within the enclosure 12 to the surrounding environment.

The depth 18 at which the recessed panel 16 is set back from the rear panel 14 may be any of a variety of amounts suitable for the given welder 10 and application. For example, in one embodiment, the depth 18 may be approximately 3" such that the engine air filter 20, the engine blower housing 24, and the recoil start 26 do not extend in an outward direction beyond the rear panel 14. Furthermore, in some embodiments, the recessed panel 16 may be set back by any suitable depth 18 such that the air filter 20, blower housing 22, and recoil start 26 do not extend beyond the rear panel 14. Such a feature may have the effect of facilitating the accessibility of the engine air filter 20 and the recoil start 26 to the operator while protecting such components from damage during transportation, storage, and/or use. For instance, the position of the air filter 20 outside the enclosure 12 but within the recessed panel 16 may provide the operator with easy access to the filter 20 for maintenance purposes (e.g., filter changes or cleanings). That is, the air filter 20 may be replaced without removal of engine access panels, disassembly of machine parts, and so forth. Further, the location of the recoil start 26 external to the housing 12 but within the recessed panel 16 may facilitate an efficient restart of the welder 10 in the event of battery failure. That is, the operator may manually restart the welder 10 in such instances without disassembly of machine parts, removal of engine access panels, and so forth. Specifically, the operator may grip the recoil knob 27 and pull in a direction away from the welder 10. Such pulling of the recoil knob 27 causes a rope connected to the knob 27 to uncoil around the end of a crankshaft located in the housing 12, thus spinning the crankshaft and starting the engine. In this way, after failure, the engine may be manually restarted from within the recess 16 but external to the enclosure 12.

Figure 2:
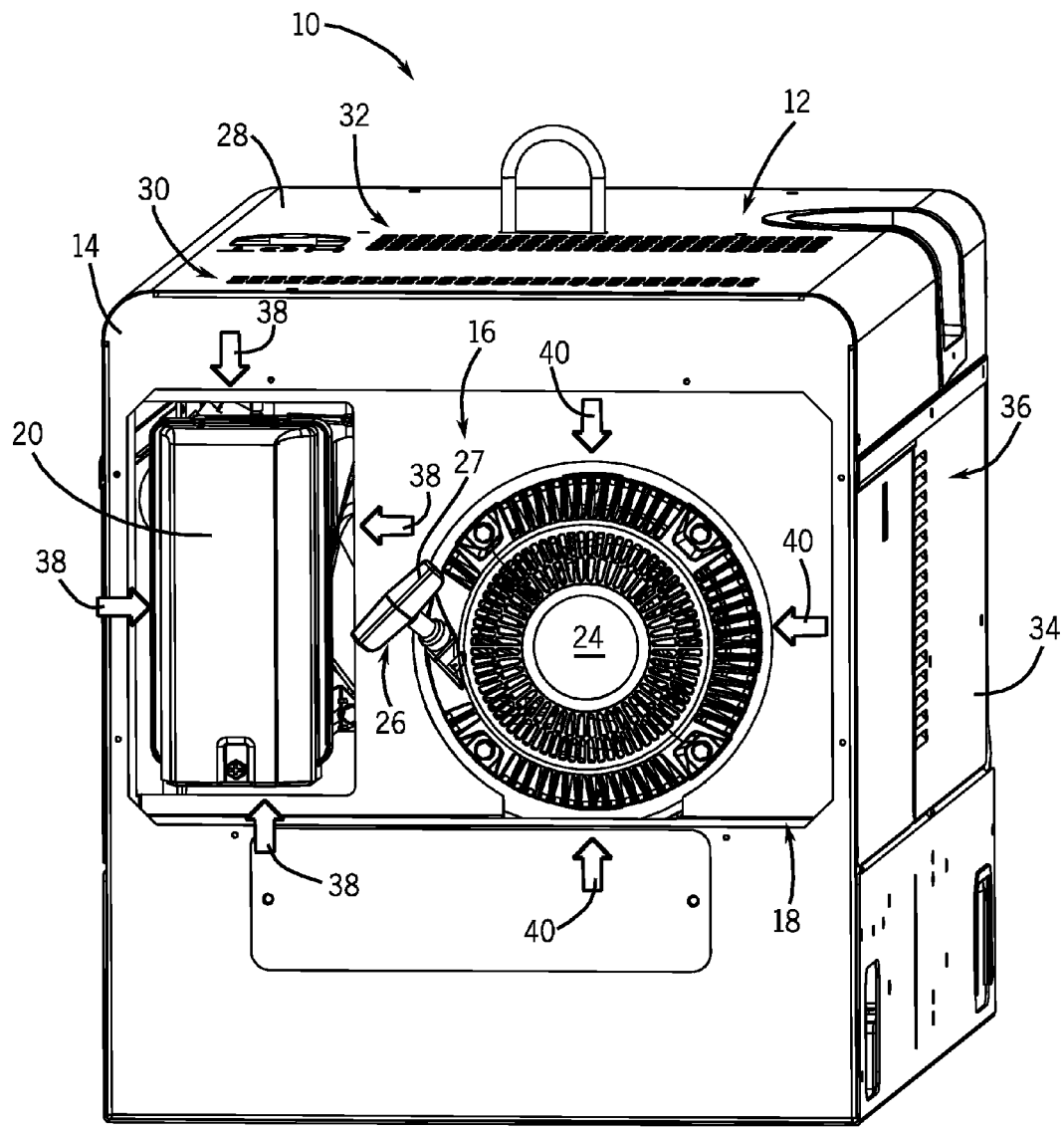
FIG. 2 is a rear perspective view of the welder of FIG. 1 illustrating components disposed in the recessed rear panel in accordance with embodiments of the present invention.

FIG. 2 is a rear perspective view of the welder 10 illustrating components disposed in the recess 16 in more detail. As shown, the recess 16 includes the air filter 20, the engine blower housing 24, and the rope start 26. During operation, such components disposed in the recess 16 may facilitate the exchange of air between the surrounding environment and internal components of the welder 10. For example, a first air source, as represented by arrows 38, may enter the enclosure 12 via the air filter 20. After entering the air filter 20, the first air source 38 may be the combustion air used to fuel the combustion process in the engine. That is, air source 38 may enter the air filter 20, be received by the engine, and be utilized as the oxidizing element in a fuel combustion process. Indeed, in presently contemplated embodiments, combustion air being supplied to the engine via the air filter 20 enters the enclosure 12 from the outside of the enclosure 12 where the air temperature is ambient. The foregoing feature may offer advantages over systems wherein hot air from within the enclosure 12 is used as combustion air. After use, combustion products 38 may be expelled from within the enclosure 12 via a muffler located in the top panel 28 of the welder 10. By further example, a second air source, as represented by arrows 40, may be drawn into the enclosure 12 via the engine blower housing 24. Once inside the welder 10, the second air source 40 may be used for engine cooling purposes. That is, the second air source 40 may be circulated over or through the engine to reduce its temperature. After cooling the engine, the second air source 40 may be expelled from within the housing 12 via one or more of vents 30, 32, 36, and/or vents located in a second side panel opposite side panel 34.

Furthermore, it should be noted that additional air flow paths may be established through the welder 10. For example, one or more air sources may enter the welder 10 via a front panel (not shown) opposite the rear panel 14. Specifically, in one embodiment, a third air source may enter the front panel, circulate over a generator for cooling purposes, and exit the welder 10 via vents 30, 32, 36, and/or vents located in the second side panel opposite side panel 34. In still further embodiments, one or more of the air paths may be combined within the welder 10 but after use such that the used air exits the housing 12 at a common location.

FIG. 3 is a perspective view of the welder 10 of FIGS. 1 and 2 that illustrates an exemplary air path 42 that air source 40 may follow during cooling of the engine. As before, air source 40 enters the welder 10 via blower housing 24. Upon entrance into the enclosure 12, the air travels along an air path 42 that directs the air through the welder 10. Specifically, air entering the unit through blower housing 24 is directed over or through the engine, thus cooling the engine, as indicated by portion 44 of air path 42. After cooling of the engine, the heated air splits at junction point 46. In the illustrated embodiment, a first portion of the heated air follows path 48 and exits the welder 10 via vents 32. A second portion of the heated air follows path 50 to exit through the vents 36 in the side panel 34. In further embodiments, the heated air may be broken up into additional portions, which may exit the welder 10 via additional vents, such as the vents 30.

During operation, the air source 40 may include air that is significantly cooler than the engine. As the air contained in the air source 40 is circulated through the welder 10 to cool the engine, a temperature of the air will be increased. Accordingly, the first air portion and the second air portion exiting the welder along path 48 and path 50, respectively, will be at a higher temperature than the incoming air source 40. In other words, air entering the blower housing 24 will be cooler than the air exiting through the vents 30, 32, 36.

FIG. 4 is a top perspective view of the welder 10 with the top panel 28 and the side panel 34 removed, thereby illustrating internal components of the welder 10. Internal components of the welder 10 may include an engine 52, a generator, electrical components 54, fans, and so forth. The engine 52 may be any of a variety of one cylinder engines suitable for welding or plasma cutting applications. Further, such engines may be capable of producing any of a variety of amounts of horsepower (HP), operating at any suitable speed, accommodating a variety of fuel capacities, and holding any suitable oil capacity. For example, in one embodiment, the engine may be a Subaru EX40 model capable of approximately 14 HP at approximately 3600 RPM and top engine speeds of approximately 3750 RPM. For further example, in another embodiment, the engine may be a Subaru EX30 model capable of approximately 9.5 HP at approximately 3600 RPM and top engine speeds of approximately 3750 RPM.

In certain embodiments, the electrical components 54 may include rectifiers, reactors, stabilizers, electronic modules, PC boards, and so forth. The electrical components 54 may be generally designed to be maintained at an operating temperature less than a designated level, such as less than approximately 130° C. The engine 52 may also be generally designed to be maintained at an operating temperature less than a designated level, such as less than approximately 150° C. Accordingly, the one or more air flow paths previously discussed may cool the electrical components 54, the engine 52, or both during operation.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding system, comprising:
   a housing;
   an engine disposed in the housing;
   a generator disposed in the housing and coupled to the engine for generating welding power; and
   a recess extending into the housing, wherein at least one of an air filter, a blower housing, a recoil start, or a combination thereof, is at least partially disposed within the recess and external to the housing.

2. The welding system of claim 1, comprising vents disposed within one or more panels of the housing, wherein the vents are configured to allow the release of heated air from within the housing.

3. The welding system of claim 2, comprising the blower housing disposed in the recess for directing air through the housing to cool the engine, the cooling air exiting the housing via the vents.

4. The welding system of claim 1, comprising the air filter disposed in the recess and configured to draw engine combustion air from an exterior side of the housing.

5. The welding system of claim 1, wherein the recess is disposed at a depth in the rear panel such that the air filter, the blower housing, or the recoil start disposed in the recess do not extend beyond the rear panel.

6. The welding system of claim 5, wherein the depth is approximately 3 inches.

7. The welding device of claim 1, wherein the recoil start is configured to start the engine via manual input.

8. A welding system, comprising:
   an enclosure comprising a rear panel;
   a single cylinder engine disposed within the enclosure;
   a generator disposed within the enclosure and coupled to the engine for generating welding power; and
   a recess extending at a depth into a portion of the rear panel, wherein a recoil start is at least partially disposed within the recess and external to the enclosure, wherein the recoil start is configured to start the single cylinder engine via manual input.

9. The welding system of claim 8, wherein the depth is sufficient such that the recoil start does not extend beyond the rear panel.

10. The welding system of claim 8, comprising an air filter disposed in the recess and configured to draw engine combustion air from an exterior side of the enclosure.

11. The welding system of claim 8, comprising a blower housing disposed in the recess for directing air through the housing to cool the single cylinder engine, the cooling air exiting the enclosure via vents disposed within one or more panels of the enclosure.

12. The welding system of claim 11, wherein neither the recoil start nor the blower housing extends outside the recess beyond the rear panel.

13. The welding system of claim 8, wherein the depth is approximately 3 inches.

14. The welding device of claim 8, wherein the manual input comprises pulling a recoil start knob to uncoil a recoil start rope within the enclosure and start the single cylinder engine.

15. A welding system, comprising:
   an enclosure having a rear panel, the rear panel having a recess extending at a depth into a portion of the rear panel;
   an engine disposed in the enclosure;
   a welding generator disposed in the enclosure and coupled to the engine for generating welding power;
   an air filter at least partially disposed in the recess and external to the enclosure, wherein the air filter is configured to draw engine combustion air from an exterior side of the enclosure;
   a recoil start at least partially disposed in the recess and external to the enclosure, wherein the recoil start is configured to permit manual starting of the engine; and
   a blower housing at least partially disposed in the recess and external to the enclosure, wherein the blower housing is configured to draw cooling air from the exterior side of the enclosure for circulation within the enclosure for cooling of the engine.

16. The welding system of claim 15, wherein the engine is a single cylinder engine.

17. The welding system of claim 16, wherein the recoil start comprises a recoil start rope within the enclosure.

18. The welding system of claim 15, wherein the depth is sufficient such that the air filter, the blower housing, and the recoil start do not extend beyond the rear panel.

19. The welding system of claim 18, wherein the depth is approximately 3 inches.

20. The welding system of claim 15, comprising an air source configured to enter a front panel of the enclosure and to circulate air over the generator for cooling.

* * * * *